United States Patent [19]
Vicain

[11] Patent Number: 5,918,837
[45] Date of Patent: Jul. 6, 1999

[54] CABLE RETAINER BRACKET AND METHOD OF INSTALLATION

[75] Inventor: James L. Vicain, Lucas, Tex.

[73] Assignee: Alcatel USA Sourcing, L.P., Plano, Tex.

[21] Appl. No.: 08/953,044

[22] Filed: Oct. 17, 1997

[51] Int. Cl.⁶ ....................................................... F16L 3/00
[52] U.S. Cl. ........................ 248/49; 174/72 A; 174/135; 248/68.1
[58] Field of Search ............................... 248/68.1, 49, 65, 248/74.3; 174/72 A, 135

[56] References Cited

U.S. PATENT DOCUMENTS

| | | | |
|---|---|---|---|
| 2,921,607 | 1/1960 | Caveney | 138/106 |
| 4,579,310 | 4/1986 | Wells et al. | 248/68.1 X |
| 4,988,062 | 1/1991 | London | 248/68.1 |
| 5,427,338 | 6/1995 | Garrete et al. | 248/68.1 |

Primary Examiner—Ramon O. Ramirez
Attorney, Agent, or Firm—Baker & Botts L.L.P.

[57] ABSTRACT

A cable retainer bracket (10) includes an elongated member (12) having two longitudinal edges (14 and 16) and a curved surface (18), the curved surface (18) defined by a predetermined radius of curvature (20). A plurality of teeth (22) are disposed along each longitudinal edge (14) and (16) which define notches (24) therebetween.

23 Claims, 2 Drawing Sheets

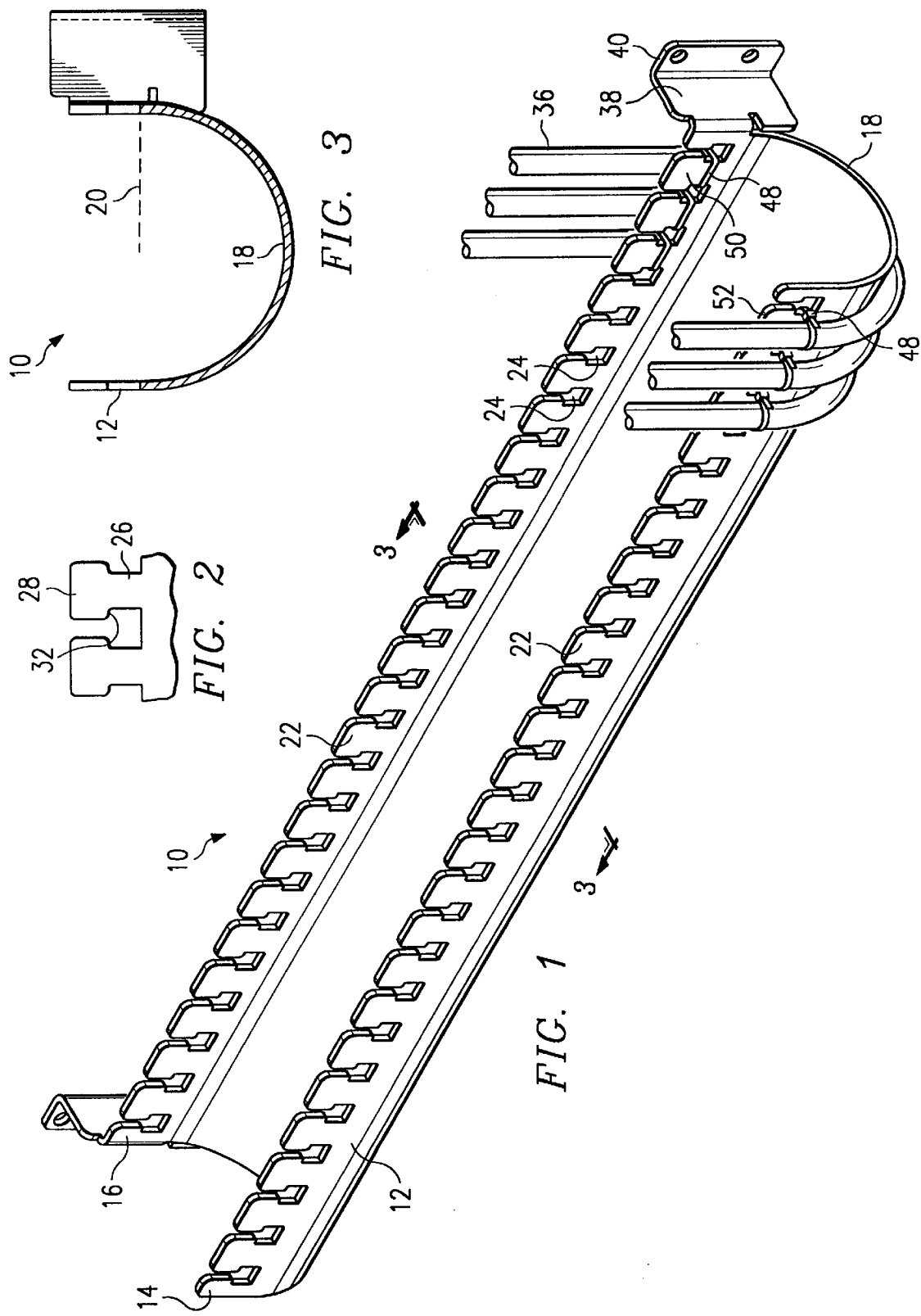

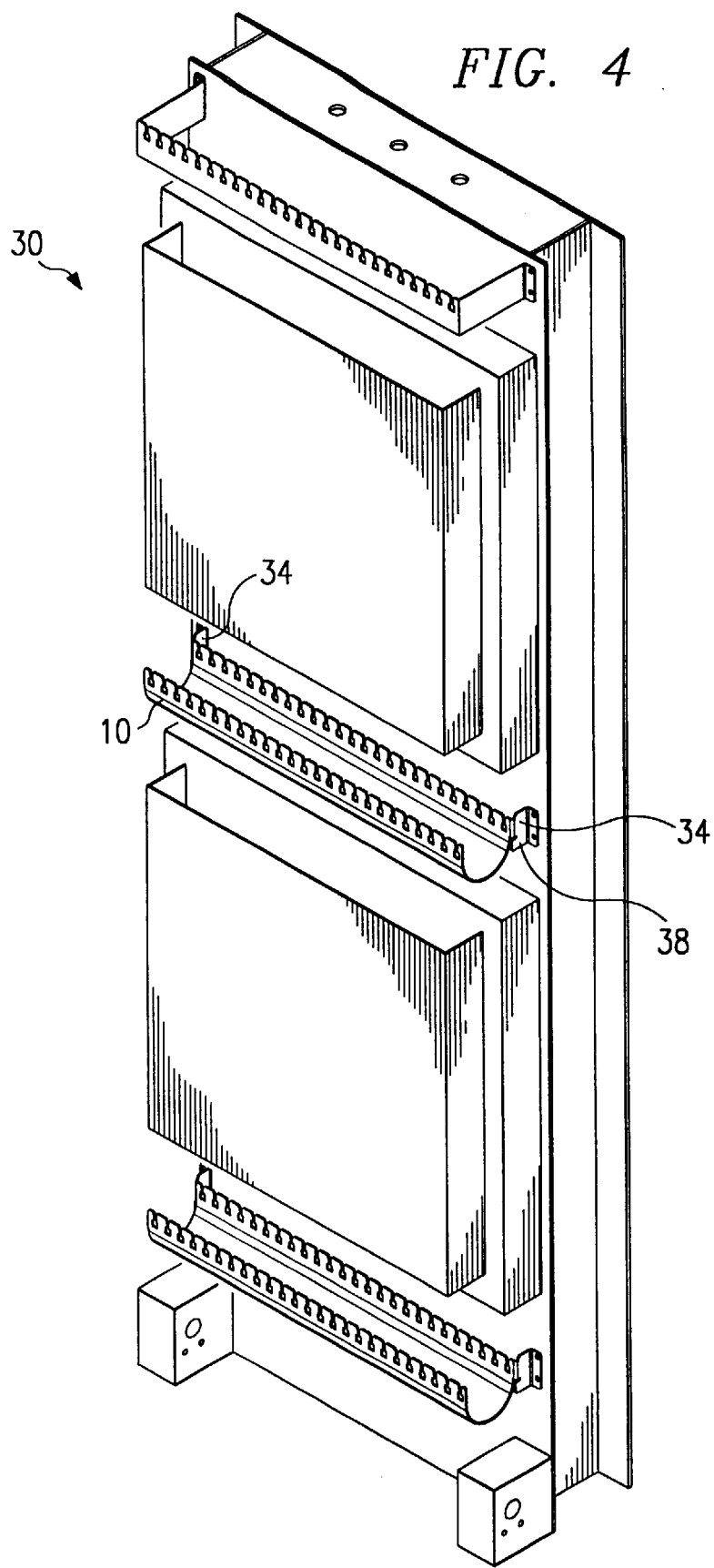

CABLE RETAINER BRACKET AND METHOD OF INSTALLATION

TECHNICAL FIELD OF THE INVENTION

The present invention relates in general to the field of electronics and telecommunications and more particularly to a cable retainer bracket and method of manufacture.

BACKGROUND OF THE INVENTION

Many industries utilize large quantities of electrical and optical cable to provide interconnections and routing between electrical equipment. For example, telecommunications companies maintain many communications applications and equipment at central offices for handling the switching and delivery of communications data within the telecommunications network. These communications applications and equipment are usually mounted in rack structures. The equipment is coupled to heavy cabling which in turn is routed out to a customer interface and then on to equipment located on customer premises. Due to stress and pressure exerted on the cables as they are installed, used, and maintained, the cables frequently must be removed and replaced. Further, because of the large number of cables involved, the cables can easily become an unmanageable, tangled mass if they are not organized and secured in some manner. The present invention offers an apparatus and method for securing cable to racks of electrical components which minimizes damage to cables and alleviates problems currently encountered when installing or replacing them.

SUMMARY OF THE INVENTION

From the foregoing, a need has arisen for a convenient and effective means to support and secure cable to electrical equipment. In accordance with the present invention, cable retainer bracket and method are provided which substantially reduce the stress and pressure placed on cable as well as facilitate cable's installation and maintenance.

In one aspect of the invention, the cable retainer bracket includes an elongated member having two longitudinal edges and a curved surface, the curved surface defined by a predetermined radius of curvature. A plurality of teeth are disposed along each longitudinal edge which define notches therebetween.

In another aspect of the invention, a method for securing a plurality of cables connected to electrical equipment comprises attaching an elongated body to a rack for storing electrical components. The elongated body has a curved surface with a predetermined radius of curvature and at least one tooth. The method also comprises wrapping a cable around the curved surface. The length of the diameter of the cable is ¼ to ⅓ the length of the radius of curvature of the curved surface. The method further comprises slipping at least one cable tie around the cable and fastening it loosely. The cable tie is slid along the cable towards the elongated body, over a tooth of the elongated body, and into a notch located on each side of the tooth. The cable tie is then tightened around the cable.

A technical advantage of the present invention includes providing a cable retainer bracket and method of installation that protects electrical and/or optical cable from additional stress and wear caused by excess kinking, bending, and twisting. Another advantage of the present invention includes providing a cable retainer bracket whereby each cable connected to a rack of electrical components can be easily identified and separated from other cables attached to the same rack. A further technical advantage includes providing a cable retainer bracket whereby cable can be installed and connected to electrical equipment quickly, cheaply, and efficiently. Yet another advantage includes allowing cable already connected to a system or rack of electrical components to be easily maintained and replaced. Other important technical advantages are readily apparent to one skilled in the art from the following figures, description, and claims.

BRIEF DESCRIPTION OF THE DRAWINGS

A more complete understanding of the invention and its advantages will be apparent from the detailed description taken in conjunction with the accompanying drawings in which:

FIG. 1 is a perspective view of a plurality of cables installed on the cable retainer bracket of the present invention;

FIG. 2 is an enlarged view of a plurality of teeth of the cable retainer bracket of FIG. 1;

FIG. 3 is a cross-sectional view of the cable retainer bracket of FIG. 1; and

FIG. 4 is a perspective view of an embodiment of a cable retainer bracket constructed in accordance with the teachings of the present invention shown attached to a rack for storing electronic and/or telecommunications components.

DETAILED DESCRIPTION OF THE INVENTION

The preferred embodiments of the present invention and its advantages are best understood by referring to FIGS. 1–4 of the drawings, like numerals being used for like and corresponding parts of the various drawings.

Referring to FIG. 1, a cable retainer bracket 10 constructed in accordance with the present invention is shown in perspective. Cable retainer bracket 10 includes an elongated member 12 having two longitudinal edges 14 and 16 connected by a curved surface 18 which is defined by a predetermined radius of curvature 20 (see FIG. 3 and discussion below). Elongated member 12 may be constructed of sheet metal such as cold rolled steel with, for example, zinc plating to reduce corrosion. Other metals or metal alloys capable of supporting the weight of a plurality of electrical or optical cables may be utilized. A plurality of cables 36 is shown secured by cable retainer bracket 10. Alternatively, a heavy gauge plastic capable of supporting the weight of cables 36 may also be used.

Material of construction may also depend on the type of cable to be retained by cable retainer bracket 10. For example, cable retainer bracket 10 may be used to support optical or fiber-optic cables. The material and construction of cable retainer bracket 10 may then be modified accordingly to support the relatively lighter weight of optical fibers. In applications that only utilize optical cable then, bracket 10, made entirely of plastic, may be utilized.

The length of elongated member 12 should correspond to the width of rack 30 to which elongated member 12 is mounted. The length of elongated member 12 may also vary depending on the application and the amount of cable needed for that specific application. For example, in an embodiment, a 21.5 inch elongated member 12 may accommodate 24 cables of approximately 0.535 inches in diameter. For applications requiring connection to only 12 pieces of cable having the same diameter, an 11.25 inch elongated member could be utilized provided that rack structure of application was of comparable width or adapted to received a smaller bracket.

Cable retainer bracket 10 includes fastener tabs 34 coupled to the ends of elongated member 12. Tabs 34 include openings which are operable to receive fasteners, such as bolts, for mounting bracket 10 to another object such as an electronics equipment rack. Tabs 34 consist of a first portion 38 extending from the ends of elongated member 12 perpendicular to longitudinal edges 14 and 16 and a second portion 40 extending from first portion 38 parallel to longitudinal edges 14 and 16. The lengths of first portion 38 and second portion 40 may depend on the type of application involved, and the dimensions of the rack utilized. Although a specific embodiment of tabs 34 is shown and described herein, bracket 10 may be secured to a rack by any known means as long as the path of the cables are not obstructed.

Elongated member 12 has a plurality of teeth 22 disposed along each of its longitudinal edges 14 and 16. Teeth 22 may be disposed at regular intervals along longitudinal edges 14 and 16 to enable the cables to be easily tied and secured around teeth 22 on each longitudinal edge 14 and 16 of elongated member 12. Teeth 22 define a plurality of notches 24 therebetween which are formed in like intervals along each longitudinal edge 14 and 16. Teeth 22 are preferably located directly across and parallel to each other along each longitudinal edge 14 and 16 of elongated member 12. Teeth 22 located as described form notches 24 on each longitudinal edge 14 and 16 of elongated member 12.

The plurality of teeth 22 disposed along longitudinal edges 14 and 16 of elongated member 12 may be comprised of a base portion 26 and a tip portion 28 as shown in FIG. 2. Base portion 26 is dimensioned with a width generally narrower than the width of tip portion 28. Teeth 22, which are shown T-shaped, may be formed with alternative outlines, as long as base portion 26 is narrower than tip portion 28 and they form notches 24 which are wider at base and narrower at their tip. Teeth 22 are capable of receiving fasteners or cable ties in the notches between them and of preventing cable ties from slipping because of the width differential just described. In general, it is also preferable to provide an abrupt or sharp transition between base portion 26 and tip portion 28 so that a fastener secured in notch 24 cannot easily slip off the teeth.

FIG. 3 is a cross-sectional view of cable retainer bracket 10. Curved surface 18 of elongated member 12 has a predetermined radius 20 that may be dependent on the radius of the cable to be utilized and the construction of the cable. Radius of curvature 20 of curved surface 18 is preferably 3 to 4 times the diameter of the cable to be secured on the cable retainer bracket 10. In the preferred embodiment, radius of curvature 20 of curved surface 18 is approximately 1.78 inches in length, and cable diameter is slightly less than ⅓ of that at 0.535 inches in length. Further, the actual radius of curvature 20 of curved surface 18 may be varied based on not only the radius of the cable but also the type of cable involved. For example, fiber-optic cables may require that a bracket be constructed with a radius of curvature greater to or equal to the minimum bending radius for optical cables.

Predetermined radius of curvature 18 prevents cable from being kinked or bent at too large of an angle. Cables bent at too great of an angle cause undesirable stress to the cable. Stress may result in the cables making improper connection to electrical equipment or in a connection that deteriorates over time. Stress may also result in the wires inside the cable becoming kinked or stretched, thus limiting their useful life-span and hampering performance.

FIG. 4 shows a cable retainer bracket 10 installed on a rack 30 for storing electrical/telecommunications equipment. Bracket 10 may be attached at the back of the rack 30 using fastener tabs 34 as shown. Alternatively, bracket 10 may be attached to the front of rack 30 with tabs 34 having longer/extended first portions 38. Other means of attachment may be utilized including manufacture of a rack structure which contains cable retainer bracket 10 as an integral component.

Referring to FIG. 1 again, cables 36 are shown installed around cable retainer bracket 10. Cable 36 is bent at a constant angle around curved surface 18. Cable 36 is arranged about bracket 10 so that cable 36 is centered in position over a single tooth 50 and 52 on each longitudinal edge 14 and 16. Cable ties 48 are shown tightly fastening cable 36 around each tooth 50 and 52. Cable ties 48 are tightened around base portion 26 of each tooth 50 and 52 and are guarded against slippage by tip portion 28 of tooth.

Cable ties 48 secure cable 36 at a point on each longitudinal edge 14 and 16 of elongated member 12. Securing cable 36 in such a manner ensures that cable 36 is held in place at two locations and at points on either side of where a bend is introduced to the cable. Having a tie 48 on either end of the elongated member 12 prevents cable 36 from slipping sideways along either edge 14 or 16 of elongated member 12. Two ties 48 also limit the amount of stress placed on cable 36 at any single point. A single tie securing cable 36 would subject cable 36 to excessive stress at that point. Using an additional tie more effectively equalizes and distributes pressure and stress over the length of cable 36 secured around bracket 10 rather than concentrating it at a single point.

As FIG. 1 shows, utilizing the present invention greatly eases the time and difficulty of the installation and replacement of cable connected to racks of electrical equipment. A cable 36 is first routed directly to bracket 10 from a customer interface (not shown). Cable 36 is then wrapped about bracket 10 so that the end of the cable 36 can be connected to electrical equipment on a rack using electrical connectors commonly known in the art. Specifically, cable 36 is wrapped around curved surface 18 of elongated member 12 so that cable 36 is lined up over a first tooth 50 formed along longitudinal edge 16 and a second tooth 52 directly opposite the first tooth 50 formed along longitudinal edge 14. Cable ties 48 are placed around cable 36 on either side of the bracket 10 and loosely fastened. Cable tie 48 is then slid down towards and into notches 24 located on either side of the first tooth 50. Tie 48 is then tightened about the narrow base portion 26 of the first tooth 50. The second tie 48 is also placed around the cable 36 and is tightened around the base portion 26 of the second tooth 52 in the same manner. Cable 36 is thus secured to bracket 10 by two ties 48 securely fastened around teeth 50 and 52 on longitudinal edges 14 and 16 of elongated member 12. By being wrapped around and secured to bracket 10 of the present invention, cable 36 is prevented from being twisted and bent in an attempt to properly align it with connectors on the electrical equipment.

Although the present invention and its advantages have been described in detail, it should be understood that various changes, substitutions, and alterations can be made therein without departing from the spirit and scope of the invention as defined by the appended claims.

What is claimed is:

1. A cable retainer bracket comprising:

an elongated member having two longitudinal edges connected and separated by a curved surface, the curved surface defined by a predetermined radius of curvature; and a plurality of teeth disposed along each longitudinal edge, the plurality of teeth defining a plurality of notches therebetween along each longitudinal edge, the elongated member operable to secure a section of a cable along the curved surface at one of the plurality of teeth along each of the two longitudinal edges.

2. The cable retainer bracket of claim 1, wherein the elongated member has a U-shaped cross-section.

3. The cable retainer bracket of claim 1, wherein the plurality of teeth are T-shaped.

4. The cable retainer bracket of claim 1, further comprising fastener tabs coupled to the elongated member operable to receive fasteners.

5. The cable retainer bracket of claim 1, wherein the plurality of teeth each has a base portion and a tip portion, the base portion having a width generally narrower than the tip portion.

6. The cable retainer bracket of claim 5, wherein the plurality of teeth each has an abrupt transition from the narrow base portion to the wider tip portion.

7. The cable retainer bracket of claim 1, wherein the elongated member is constructed of a metal alloy.

8. The cable retainer bracket of claim 1, wherein the elongated member is constructed of cold rolled steel.

9. The cable retainer bracket of claim 1, wherein the plurality of teeth are disposed at regular intervals along each longitudinal edge.

10. The cable retainer bracket of claim 1, wherein the predetermined radius of curvature of the curved surface is dependent on the diameter of at least one cable secured by the elongated member.

11. The cable retainer bracket of claim 1, wherein the predetermined radius of curvature of the curved surface is three to four times the diameter of at least one cable secured by the elongated member.

12. A cable retainer bracket comprising:

an elongated member having a generally U-shaped curved cross-section and two longitudinal edges;

the elongated member having a predetermined radius of curvature;

a plurality of teeth disposed along each longitudinal edge of the elongated member defining a plurality of notches disposed therebetween along each longitudinal edge;

the plurality of teeth having a base portion and a tip portion, the base portion having a width generally narrower than the tip portion; and fastening tabs coupled to the elongated member operable to receive fasteners to secure the elongated member to another structure, the elongated member operable to secure a section of a cable along the generally U-shaped curved cross-section at one of the plurality of teeth of each longitudinal edge.

13. The cable retainer bracket of claim 12, wherein the plurality of teeth are T-shaped.

14. The cable retainer bracket of claim 12, wherein the plurality of teeth are disposed along the entire length of each longitudinal edge.

15. The cable retainer bracket of claim 12, further comprising fastener tabs coupled to the elongated member operable to receive fasteners.

16. The cable retainer bracket of claim 12, wherein the elongated member is constructed of cold rolled steel.

17. The cable retainer bracket of claim 12, wherein the plurality of teeth are disposed at regular intervals along each longitudinal edge.

18. The cable retainer bracket of claim 12, wherein the predetermined radius of curvature of the curved surface is three to four times the diameter of at least one cable secured by the bracket.

19. A method for securing a plurality of cables connected to electrical equipment comprising the steps of:

attaching an elongated body to a rack for storing electrical components, the elongated body having a curved surface and at least one tooth, the curved surface having a predetermined radius of curvature;

wrapping cable around the curved surface, the cable having a diameter that is ¼ to ⅓ of the radius of curvature of the curved surface;

slipping at least one cable tie around the cable and fastening it loosely;

sliding the cable tie along the cable towards the elongated body over the tooth of the elongated body and into a notch located on each side of the tooth;

tightening the cable tie around the cable.

20. The method of claim 19, wherein the step of attaching an elongated body further comprises the elongated body having a plurality of teeth, the teeth being generally T-shaped.

21. The method of claim 19, wherein the step of attaching an elongated body further comprises the elongated body having a plurality of teeth, the teeth having a base portion and a tip portion, the base portion having a width generally narrower than the tip portion.

22. The method of claim 19, further comprising coupling fastener tabs to the elongated body operable to receive fasteners.

23. The method of claim 22, wherein the step of attaching an elongated body further comprises attaching fastener tabs to a rack for storing electrical components using fasteners.

* * * * *